United States Patent [19]

Chaplow et al.

[11] 3,843,823
[45] Oct. 22, 1974

[54] METHOD OF REMOVING UNDESIRABLE SOLIDS FROM COFFEE EXTRACT

[75] Inventors: Richard A. Chaplow, Pierre Fonds, Quebec; Ronald A. Hodgman, Lachine, Quebec, both of Canada

[73] Assignee: General Foods, Limited, Ontario, Canada

[22] Filed: May 21, 1970

[21] Appl. No.: 39,198

Related U.S. Application Data

[63] Continuation-in-part of Ser. No. 855,970, Sept. 8, 1969, Pat. No. 3,765,910.

[52] U.S. Cl. ............... 426/384, 62/58, 426/193, 426/489, 426/495
[51] Int. Cl. ............................................. A23f 1/08
[58] Field of Search .................... 99/71, 199; 62/58

[56] References Cited
UNITED STATES PATENTS

| | | | |
|---|---|---|---|
| 2,335,206 | 11/1943 | Darling | 99/71 |
| 2,408,260 | 9/1946 | Kellogg | 99/71 |
| 2,895,835 | 7/1957 | Findlay | 62/58 |
| 2,947,634 | 8/1960 | Feldman | 99/71 |
| 3,050,952 | 8/1962 | Marwil | 62/58 |
| 3,205,078 | 9/1965 | Lund | 62/58 |
| 3,244,530 | 4/1966 | Byer et al. | 99/71 |
| 3,283,522 | 11/1966 | Ganiaris | 62/58 |
| 3,361,572 | 1/1968 | Nutting et al. | 23/310 |
| 3,362,178 | 1/1968 | Cottle et al. | 62/58 |
| 3,381,302 | 4/1968 | Reimus et al. | 99/71 |
| 3,404,007 | 10/1968 | Muller | 99/71 |
| 3,531,295 | 9/1970 | Ganiaris | 62/58 |

OTHER PUBLICATIONS

Sivetz & Foote, Coffee Processing Technology, 1963, Vol. 2, AVI Pub. Co., Westport, Conn. (pp. 14–21).
Sivetz & Foote, Coffee Processing Technology, 1963, Vol. 1, AVI Pub. Co., Westport, Conn. (pp. 294–295).
Perry et al., Chemical Engineers Handbook, 3rd Ed., 1950, McGraw-Hill Pub. Co., N.Y., p. 988.

*Primary Examiner*—Norman Yudkoff
*Assistant Examiner*—R. T. Foster
*Attorney, Agent, or Firm*—Gerald E. Jacobs

[57] ABSTRACT

Coffee extract obtained by percolation is run through a filter capable or removing all visible sediment and organic matter and of reducing bacteria and other microscopic organic material to a high degree. Such a filter is, for example, of the medium duty type used for water systems, such as, public, semipublic or private swimming pools. A pair of filters are provided to permit one to be cleaned while the other is in service. This removes all visible matter and highly reduces microscopic matter in the extract (including nuclei for agglomeration of waxes and tars) which might clog downstream freezing apparatus, such as, crystallizers. Remaining insoluble solids which might form dark specks are removed by clarification in a disludging type centrifuge after freeze concentration and preliminary to freezing before freeze drying. The aforementioned filtration is accomplished at relatively high temperatures, such as from 190° to 215° F, and the centrifugal clarification at about normal ambient temperatures, such as from about 50° to 80° F and more usually between 60° to 70° F. The overall process provides a pleasantly colored product free of discoloring specks.

17 Claims, 1 Drawing Figure

3,843,823

METHOD OF REMOVING UNDESIRABLE SOLIDS FROM COFFEE EXTRACT

CROSS-REFERENCES TO RELATED APPLICATIONS, IF ANY

This application is a continuation-in-part of copending application for U.S. Patent, Ser. No. 855,970, filed Sept. 8, 1969 now U.S. Pat. No. 3,765,910 by these same inventors.

BACKGROUND OF THE INVENTION

Percolated extract contains undesirable solids, such as microscopic pieces of coffee bean, flocculent material, sediments, etc. and indeterminate microscopic matter. These solids if allowed to remain in the extract during the colder steps in the freeze drying process, such as prior to and during freeze concentration provide nuclei for the formation of insoluble precipitation such as waxes, tars etc. Such waxes and tars undesirably speckle the ultimate product with dark spots as well as tending to clog apparatus in the process, more particularly freeze concentration equipment. Various methods have heretofore been used to remove waxes and tars from the extract prior to freeze concentration, such as described in U.S. Pat. No. 1,507,410 to Zorn, which is directed to removal of insolubles after they precipitate in the extract. An object of this invention is to provide a simple, economical and effective method for preventing the precipitation of undesirable insolubles in coffee extract.

SUMMARY

Coffee extract obtained from percolation is filtered while still hot at temperatures ranging, for example, from 190° to 215° F. Filtration is accomplished in a medium duty type filter, such as the type used in swimming pool water systems for removing all visible sediment and organic matter and reducing bacteria and other organic material to a high degree. Such a filter removes all visible solids, flocculant material, coffee bean chaff, etc., which act as nuclei for formation of insoluble wax and tar globules, which might clog freeze concentration or other apparatus used in making freeze dried coffee. The filtered extract is freeze concentrated, for example, in a crystallizer of the scraped wall type having a relatively high delta T (for example 35° to 50° F.) and a relatively low residence time (for example from 3 to 10 minutes). Such a crystallizer generates a slush of fine ice crystals and concentrated coffee extract. The extract is separated from the ice crystals in a centrifuge, for example, of the basket batch type. The ice crystals are melted and the resultant weak extract is concentrated and added back into the liquid extract obtained in the separation, otherwise referred to as mother liquor. The combined extract is heated to ambient temperatures and clarified, for example, in a desluging type centrifuge. This completes the removal of any undesirable insoluble solids which might have formed despite the previous filtration step and undesirably speckle the ultimate freeze dried product with undesirable dark spots. The clarified extract is then frozen and freeze dried to provide clean and flavorful freeze dried coffee extract.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single FIGURE is a schematic diagram of a process for freeze concentrating coffee extract which is an embodiment of this invention.

DESCRIPTION OF THE PREFERRED EMBODIMENT

Figure 1:
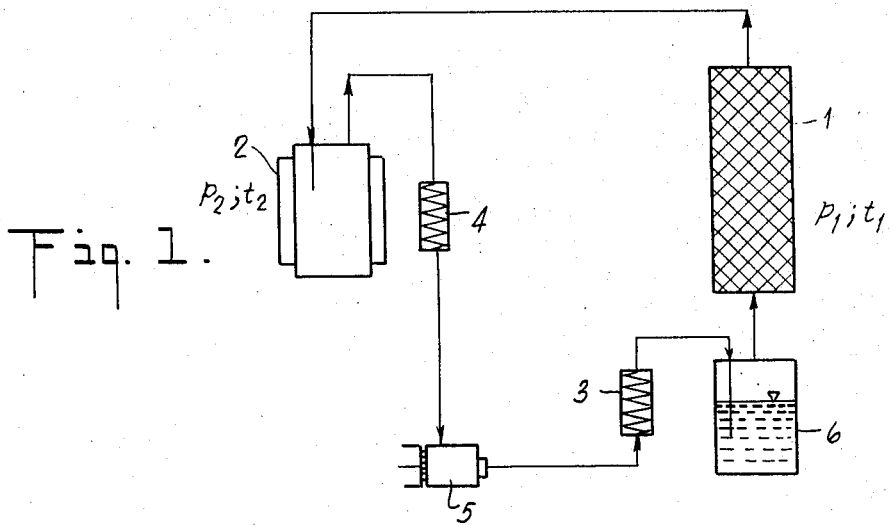
Figure 2:
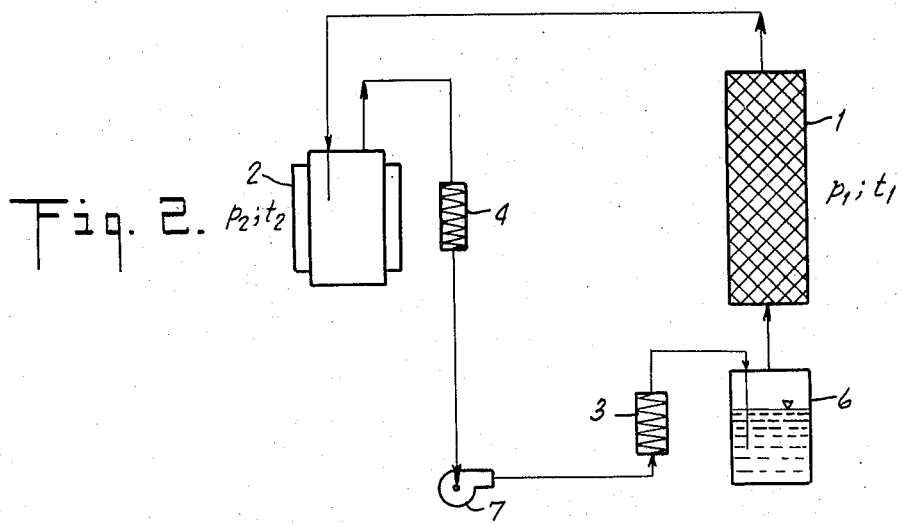
Figure 3:
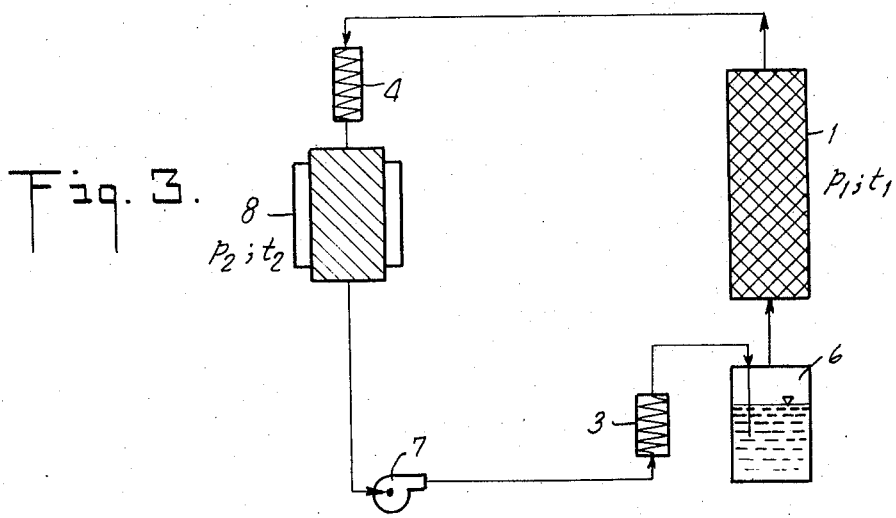

Coffee extract is, for example, obtained from extracter 10, such as a conventional percolator. The percolated extract has a solids content, for example, of 20 to 35 percent, and usually from 24 to 30 percent by weight. The percolation technique is not involved in the present invention and utilizes conventional roasted and ground coffee blends.

The percolated extract then passes into filter 12 at the relatively high percolator temperature ranging, for example, from 190° to 215° F. Filter 12 is, for example, a medium duty type of filter, such as the type used in medium capacity water systems for removing all visible sediment and organic matter and reducing bacteria and other organic material to a high degree. This type of filter is commonly used for filtering the water in swimming pools used in public, semi-public and private installations. A pair of such filters are provided to permit one of them to be cleaned while the other is being used.

A suitable type of filter for this service is a Model SCH general purpose water filter made by Sparkler Manufacturing Co., Mundelein, Ill., and similar types are described in Perry's Chemical Engineers' Handbook, Third Edition, McGraw-Hill Book Co., Inc., Copyright 1950, page 988 and Fourth Edition, Copyright 1963, page 19–71. The particular swimming pool filter described above somewhat differs from those described in Perry's Chemical Engineers' Handbook and is operated at pressures ranging from 30 to 70 psig. and flow rates of 6 to 11 gpm. It includes, for example, seven filter leaves which can be precoated with diatomaceous material but are usually not precoated to perform the coffee extract filtration of this invention. The leaves are approximately 2 to 3 feet in diameter and the extract is conducted from the outside to the inside. The leaves are covered by screen mesh, for example, of 80 mesh stainless steel. Insoluble solids are deposited on the outer surfaces of the mesh. When the pressure drop through the filter is prohibitively increased by solid deposits, the flow is switched to the standby filter and the blocked filter leaves are removed and cleaned. The filter of the type described is removed from the stream and cleaned when the pressure rises to 70 psig. and operates at 30 psig. after cleaning. The filtered extract is unexpectedly free of undesirable waxes, tars and sediments which might clog lower temperature steps of the freeze concentrating and freeze drying process, because the nuclei for the formation of the waxes, tars, etc., are largely eliminated from the extract.

The temperature of the filtered extract is then reduced in cooler 14 to, for example, 40° to 70° F. to reduce the heat load on the subsequent crystallizer and also to prevent flavor degradation which might result if the percolated extract is held too long at elevated temperatures.

The extract is then supplied to crystallizer 16, which is of the scraped wall type having a relatively low residence time and a relatively high delta T. Such a crystallizer is made by the Votator Division of Chemetron Corporation under the trademark "Votator." See Chemical Engineers' Handbook by Perry, Fourth Edition, Copyright 1963, McGraw-Hill Book Co., page 17–17. This type of crystallizer generates a slush of fine ice crystals and concentrated coffee extract. The residence time in crystallizer 16 is from about 3 to 10 minutes, which is relatively low in comparison to the other types of crystallizers in which the extract is held for approximately 2 to 4 hours. Such low residence time minimizes precipitation of any wax-like insolubles which may be present in the extract and prevents clogging of subsequent equipment in the process. The relatively high delta T is, for example, from 35° to 50° F.

The effluent from crystallizer 16, consisting of a slush of ice crystals and concentrated coffee extract, is delivered to separator 20. Separator 20 is, for example, a basket type batch centrifuge of the type described in Perry's Chemical Engineers' Handbook, Fourth Edition, by McGraw-Hill Book Co., Copyright 1963, page 19–94, FIGS. 19–145.

Concentrated extract from separator 20 is led through line 22 to storage tank 24. The plowed ice crystals are directed through line 26 to melting tank 28. The dilute extract in melting tank 28 is directed to concentrator 30, which is, for example, of the evaporative type. Water is removed at line 32 and the concentrate derived from the ice cake melt is added back through line 34 to storage tank 24. Any flavor degradation caused by evaporation does not materially affect the flavor of the combined extract in tank 24 because it is a low percentage of the combined extract. Flavor degradation can be minimized, if desired, by utilizing a vacuum type evaporator. The combined extract is maintained in storage tank 24 a relatively short time such as 15 minutes to 2 hours, and normally between 15 minutes and 1 hour.

The combined concentrated extract having a solids content of approximately 30 to 45 percent by weight is then heated in storage tank 24 by heater 25 to a normal ambient temperature of about 50° to 80° F. and preferably from about 60° to 70° F to facilitate clarification in a desludging type centrifuge. Undesirable insolubles which might have formed in the extract and any other material which might have passed through the first filter are then easily removed in clarifier 36, which is for example a closed feed and discharge disk bowl centrifuge as described in Perry's Chemical Engineers' Handbook, Third Edition, Copyright 1950, page 1,000, FIG. 106. Such a centrifuge is sold under the trade name "Westfalia." If these undesirable insolubles are not removed before freeze drying, they speckle the product with undesirable black spots which appear as unacceptable foreign matter in a reconstituted cup of the coffee.

The clarified concentrate extract is frozen in freezer 38 and ultimately dried in freeze dryer 40 to provide clean and flavorful freeze dried coffee.

We claim:

1. A method of removing undesirable solids from coffee extract comprising the steps of obtaining coffee extract, filtering said extract in a medium duty filter to remove visible sediment and organic material and to highly reduce microscopic insolubles, reducing the temperature of the filtered extract, freeze concentrating said extract, subsequently heating said concentrated extract to between 50°–80° F and clarifying the heated concentrated extract in a desludging-type centrifuge effective to remove insolubles which if not removed prior to drying cause undesirable black spots to appear as foreign matter in a reconstituted cup of coffee.

2. A method as set forth in claim 1 wherein said filtration is accomplished at about normal percolation temperatures.

3. A method as set forth in claim 2 wherein said temperatures range approximately from 190° to 215° F.

4. A method as set forth in claim 1 wherein said filter is of the medium duty water system type.

5. A method as set forth in claim 4 wherein said filter is of the type used for filtering swimming pool water.

6. A method as set forth in claim 1 wherein said filter includes a number of filter leaves, and the flow is from outside to inside of said filter leaves.

7. A method as set forth in claim 6 wherein said filter leaves are enclosed within mesh screens and said insolubles are trapped upon said screens.

8. A method as set forth in claim 1 wherein said filtering is accomplished at pressures ranging from about 30 to 70 psig.

9. A method as set forth in claim 1 wherein said filtering is accomplished at a flow ranging from about 6 to 11 gpm.

10. A method as set forth in claim 1 wherein said clarification is accomplished in a desludging type centrifuge.

11. A method as set forth in claim 10 wherein said clarification is accomplished at temperatures between about 50° and 80° F.

12. A method as set forth in claim 10 wherein said clarification is accomplished at temperatures between about 60° to 70° F.

13. A method as set forth in claim 1 wherein the extract is freeze concentrated in a crystallizer having a residence time ranging from about 3 to 10 minutes.

14. A method as set forth in claim 1 wherein said extract is freeze concentrated in a crystallizer having a delta T of about 35° to 50° F.

15. A method as set forth in claim 1 wherein said freeze concentration involves the separation of effluent into concentrated liquid extract and ice crystals, said ice crystals being melted, concentrated and added back to said concentrated liquid extract.

16. A method as set forth in claim 1 wherein said freeze concentration employs a separating centrifuge of the basket type.

17. A method as set forth in claim 1 wherein the filtered extract is cooled to about 40° to 70° F before freeze concentration.

* * * * *

UNITED STATES PATENT OFFICE
CERTIFICATE OF CORRECTION

Patent No. 3,843,823    Dated October 22, 1974

Inventor(s) Richard A. Chaplow et al.

It is certified that error appears in the above-identified patent and that said Letters Patent are hereby corrected as shown below:

The sheet of drawing as shown on the attached page should be including:

In the Abstract, line 14, after "a" "disludging" should be -- desludging --.

Column 1, line 57, before "type" "desluging" should be -- desludging --.

Signed and sealed this 20th day of May 1975.

(SEAL)
Attest:

RUTH C. MASON
Attesting Officer

C. MARSHALL DANN
Commissioner of Patents
and Trademarks